Jan. 4, 1966  W. GOSSIAUX  3,227,147
SHOCK ABSORBING TUBING FOR DIESEL ENGINE
FUEL INJECTION SYSTEMS
Filed May 1, 1964  2 Sheets-Sheet 1

INVENTOR
WILLY GOSSIAUX

BY Emory L. Groff Jr.

ATTORNEY

United States Patent Office 3,227,147
Patented Jan. 4, 1966

3,227,147
SHOCK ABSORBING TUBING FOR DIESEL
ENGINE FUEL INJECTION SYSTEMS
Willy Gossiaux, 4 Place Chevelu, Geneva, Switzerland;
Camille Gossiaux, executrix of said Willy Gossiaux,
deceased
Filed May 1, 1964, Ser. No. 364,229
Claims priority, application Switzerland, July 15, 1959,
75,818/59
7 Claims. (Cl. 123—139)

This application is a continuation-in-part of my application Serial No. 42,557, filed July 13, 1960, now abandoned.

The invention herein described relates to pipe connecting unions and more particularly, to tubes or pipes for use with the fuel injection system of diesel engines.

It is a well known fact that injector tubes commonly in use in the fuel injection systems of diesel engines are frequently subjected to breakage. Such tubes have heretofore been made of metal such as steel, and the breakage thereof is due to various causes such as: the conventional method of securing said tubes in the system wherein the clamping strain operates on a small contacting surface; the vibrations to which the tube is subjected by normal road shocks transmitted to the vehicle and the vibration of the motor cause bending of the tube at its weakest point; additional vibrations caused by the pump, the injector, the pressure waves and the hydraulic shocks all tend to render the metal tubes brittle at a point intermediate its length or at its joint; when the vibrations thus occurring reach a critical wave length, there is created a destructive resonance effect on the tubes.

Other disadvantages of injector tubes commonly in use are that, due to inherent roughness of the inner surface of the tubes even though it may be slight, nevertheless, it tends to restrict the passage of fuel thus causing a loss in power. Also, conventional tube connecting methods cause a reduction in the inner diameter of the tubes when the nut is tightened which results in a loss of power and an increased consumption of fuel for each H.P./hour supplied.

Another drawback to known types of injection tubes which are usually made of steel, is that the fuel contains various matter capable of attacking the metal which causes rusting of the tubes. When particles of rust flake off and reach the injector needles which have a clearance of only a few microns, it is evident that considerable damage to the system results causing a breakdown of the system and a resultant stopping of the motor.

The necessity of having an injection tube which will withstand severe shocks and vibrations is further accentuated by the fact that the pressure of injection may vary between 50 and 1000 atmospheres, thus subjecting the tubes to pulsations of very high frequency due to the high speed operation of modern engines.

Accordingly, the objects of the present invention are to overcome these many disadvantages of known fuel injection tubes and the means for connecting them by providing an outer tube of specially drawn steel, an inner tube of a super-polyamide material, a clamping ring of super-polyamide material having a high elasticity modulus and with self-distributing pressure on the tube all of which cooperate with each other and with other related elements to produce a new and unexpected result as will be hereinafter described.

Although the special properties of polyamide are known generally, it is important to note that it was actually these known elastic properties which up until applicant's invention had led the experts to avoid using such material as an elastic interlining for injection units.

Despite the fact that, for many years, elastic lining has been known with regard to tubes or pipes, no one has ever seriously considered using a connecting pipe of this type for injection pumps, the reasons for this being as follows.

Hitherto it has been erroneously presumed to be self-evident that, the constancy of the injection characteristics of diesel engines is essentially dependent on the fact that the supply pipe is of completely rigid construction so that the pulsating pressure shocks are transmitted in a fully defined and reproducible manner. On questioning specialists in this field, they have taken it for granted that an elastic inner lining of such connecting pipes for reducing the pressure shocks would certainly alter the injection characteristics in a non-defined manner. When it could be proved to them that this is not necessarily the case, and that lining the connecting pipes with an "elastic material of a suitable type" offers on the contrary significant technical advantages, they were amazed. An elastic material of such a suitable type is superpolyamide.

It is also important, to achieve the objects of the invention, that the wall thickness of the inner tube be not less than 0.5 mm.

In actual practice of applicant's invention, with pipes for diesel-oil there are used:

(a) Internal diameter 1.95 mm. (instead of the otherwise customary 2 mm.) as, on account of the reduced flow resistance, this internal diameter is equivalent in practice to the internal diameter of standard steel pipes of 2 mm.

(b) Wall thickness of the polyamide pipe: 0.8 mm. For gasoline there are used in practice:

(a) Internal diameter 3.1 mm. (which is equivalent to an internal diameter of 3.5 mm. with standard pipes);

(b) the wall thickness of the polyamide inner pipe will then be greater than 1 mm.

The fact that the same flow performance are attained with smaller internal diameters proves the technical superiority of the pipes according to the invention.

As already mentioned, the opinion of the technical world against elastic inner linings with this type of pipe is based on the understandable, although erroneous, assumption that the injection characteristic would be altered in an indefinite manner by the pulsatingly enlarging pipe.

The injection characteristic is, however, constant, due to the fact that polyamide, while being elastic, is not, however, compressible so that the effective flow aperture actually remains accurately constant. An "expansion" is always compensated by an adjacent "contraction" of the inside wall.

Some of the technical advantages of the invention are the following:

(1) the superpolyamide inner lining softens the unavoidable impacts by absorbing the mechanical pressure shocks and, more particularly, prevents resonance oscillations;

(2) The extraordinarily smooth surface of the lining of synthetic material brings about an appreciably smaller resistance to the flow of the fuel;

(3) The danger of rust or corrosion of the inner wall of the connecting pipe is excluded with certainty;

(4) By using the inner lining made from synthetic material which represents an appreciable proportion of the material of the entire pipe, the connecting pipes corresponding to the invention are considerably lighter than the customary injection pipes;

(5) Even if, for any reason whatsoever, the outer metal casing should be fractured, because of the tear-resistant nature of the superpolyamide inner tube, the connecting pipe will continue to function over a considerable period of time;

(6) With connecting pipes according to the invention, the internal diameter remains constant.

Numerous tests and the actual experience of users including large firms, go to show that, on the one hand, the durability and resistance of the connecting pipe according to the invention are greater than is the case with known connecting pipes and, what is more, there is achieved a higher output for the same fuel consumption; in other words, there is a saving in fuel.

With these and other objects in view which will more readily appear as the nature of the invention is better understood, the invention consists in the novel construction, combination, and arrangement of parts, hereinafter more fully described, illustrated, and claimed.

A preferred and practical embodiment of the invention is shown in the accompanying drawings, in which.

Similar reference characters designate corresponding parts throughout the several figures of the drawing.

Figure 1:
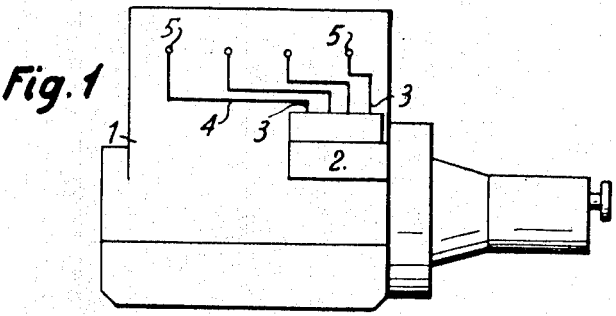
FIGURE 1 is a schematic view in elevation of a diesel motor, showing the arrangement of the injection pipes relative to the fuel injection pump and fuel injectors.

With reference to FIGURE 1, the diesel motor 1 includes an injection pump 2 of a standard construction of which each of the outlet members 3 is connected by an injection pipe 4 constructed according to the present invention to a respective injector 5 adapted for the pulverization of the fuel into the corresponding cylinder of the engine. These injection pipes 4 comprise a tube 6 of flexible synthetic material, for example, of the material known in the trade by the mark "Nylon," or other super-polyamide material. The inner tube 6 of synthetic material is sheathed by an outer metallic tube 7, for example, of steel. By way of example, typical dimensions for the inner tube 6 of such an injection pipe are: minimum wall thickness, 0.5 mm., maximum wall thickness 2 mm., and minimum internal diameter, 1.5 mm., maximum internal diameter 4 mm. Both of these dimensions may vary according to the type of fuel used as previously pointed out. Typical dimensions for the outer metallic tube 7 are: wall thickness between 0.3 and 2 mm. The wall thickness of the outer tube can be smaller than the thickness of the inner tube.

The opposite ends of each of the pipes 4 are secured to appropriate fittings on the related parts which they connect. That is to say, they are connected to the nozzle 3 of the injector pump 2 and the outer end of injectors 5, each of which are provided with a threaded nipple member 9. A connection member 8 in the form of a tapped nut having an enlarged central chamber is adapted to be screwed on the threaded member 9 when the parts are fully assembled.

With the end of the pipe 4 thus engaged in the opening in the member 9, a ring 10 adapted to form a joint is placed in the chamber provided between the pipe 4 and the connection 8 so as to be clamped between the member 9, the connection 8 and the pipe 4 by flowing around the pipe during the tightening of the connection. These parts, member 9 and connection 8, have conical surfaces 11 and 12 respectively, adapted to facilitate the flowing or extrusion of the ring 10. This is also of flexible synthetic material, such as "Nylon." It may also, if desired, be sheathed by a metallic tube.

Figure 4:
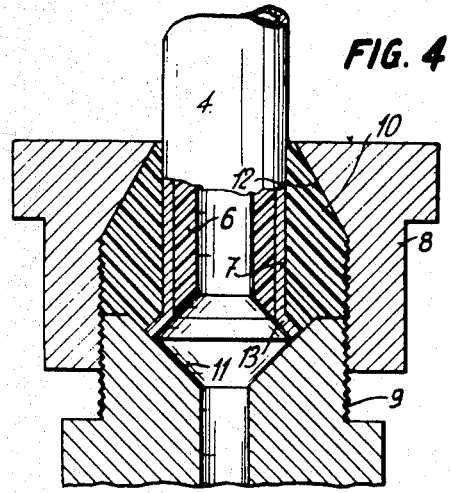
FIGURES 4 and 5 are views similar to FIGURE 3, showing two modified forms of construction.

According to the pressures which the tubular part of the connection has to support and in order to avoid any sliding or disengagement of the pipe 4 out of the connection 8, it is advantageous to widen the end of the pipe 4, as shown at 13 in FIGURE 4.

Figure 5:
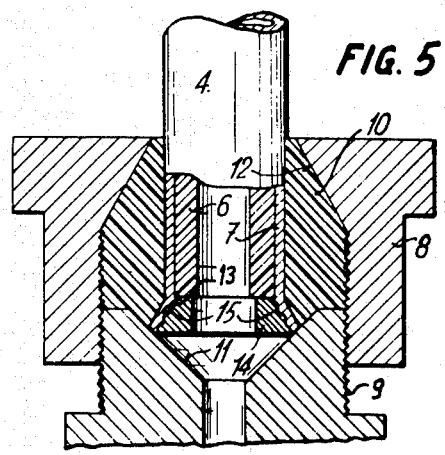

FIGURE 5 shows another form of construction in which a rigid ring 14 is introduced into the end of the pipe 4 for avoiding in a more certain manner, any disengagement of the pipe 4 from the connection 8 by reason of the high pressures action thereon, or due to the vibrations to which the tube of the connection is subjected.

This rigid ring 14, preferably made of metal, has a progressive external section for facilitating its penetration into the tube 4 while forming a splaying portion 13 in its extremity.

In FIGURE 5, the ring 14 is of general truncated shape, and concentric ribs 15 are formed on its external wall for causing a locking of the ring 14 in the tube 4. This ring may be forced into the tube 4 by a hammer or other means.

Figure 6:
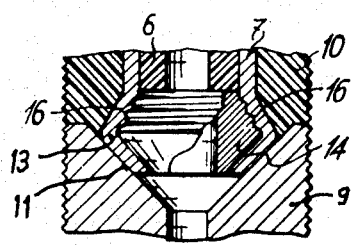
FIGURE 6 shows a modification of a detail.

In a further modification, it is also possible to provide a rib 16 in the form of a conical screw thread on the outer wall of the ring 14, to permit forcing it into the tube 4 by screwing it into said tube. This modification has been shown in FIGURE 6 in which the ring 14 is of general bitruncated shape. In this case, the metal tube 7 is forced around the ring 14 either preliminarily on a mounting, or at the moment of tightening the connection 8 by the pressure which the ring 10 exerts on the bell-mouth part of the tube 7.

In a further modification, the ring 14, instead of being of general truncated or bi-truncated shape, may be of rounded shape, for example of olive shape pierced with an outlet for the passage of fluid.

A cheaper method of operation for preventing the tube from being disengaged from the connection 8, for lower pressures, consists in providing on the metal tube 7, at the point at which the ring 10 is to be clamped, ribs, grooves, bosses, or other deformation, which permits of locking the ring 10 against the tube.

The tests in operation on internal combustion motors with connection tubes such as hereinbefore described, have shown incontestable advantages compared to the steel tubes usually used. In fact, by reason of the presence of the tube 6 of flexible synthetic material, the rapid pulsations in the interior of the pipe, and also the fluid hammering, are deadened or absorbed, which avoids excessively strong forces on the steel sheath 7. The ring 10, also of flexible synthetic material, permits also of deadening the transmission of vibrations between the injection pump 2 and the motor block 1. After trials of long duration of the operation of motors provided with these pipes, there has not been observed any breakage thereof, and even when the metal sheath 7 splits, no leakage is produced, by reason of the presence of the flexible tube 6.

On the other hand, it has been found that an increase in the power of the motor results from a number of factors such as, a better flow of fuel into the pipe by reason of the presence of the tube of flexible synthetic material, of which the surface of contact with the fuel is particularly smooth, and also the effect of inflation of the tube 6 at the moment of each impulse of fuel, which inflation is transmitted along the pipe and thus conserving on the fuel supplied a much higher pressure up to the injector 5.

Further, the problem of clogging the injectors by particles of metal or rust detached from pipes of ordinary construction and which are carried away by the fuel, are eliminated by the connecting pipes above described, in a positive manner, in view of the fact that the inner wall of the sheath 7 of steel does not come into contact with the fuel which is conducted by the tube 6 of synthetic material, for example of super-polyamidic material.

Figure 2:
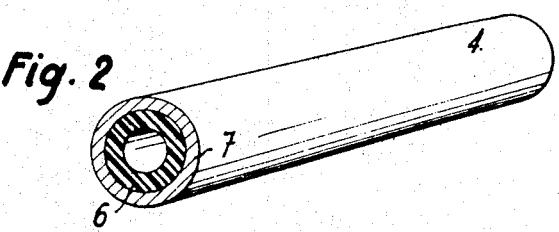
FIGURE 2 is a perspective view partly in section of a length of pipe section.
Figure 3:
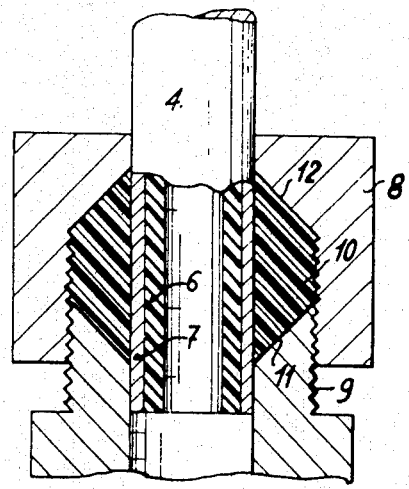
FIGURE 3 is a view in section of the union at the end of a pipe.

It will be understood that pipes such as those shown in FIGURE 2 may be applied in cases quite different from that of internal combustion engines. They may be applied in all cases in which the pipes are subjected to high pressures, or in which there are used high frequency pulsations. It is possible, for example, to use these pipes in installations for the hydraulic control of machine tools, and in transmission groups of hydrostatic power.

The material used for forming either the tube 6 or the metallic sheath 7, may be selected according to the field of application of the pipe, as also the dimensions of said tubes 6 and 7 may vary. Thus, it is not only possible to use pliant synthetic materials for the tube 6 but also materials of the rubber type.

The pipes above described are also advantageous from the standpoint of security and are applicable to pipes of hydraulic brakes which retain their efficiency even when the metallic sheath 7 cracks.

Another area of use of the connecting tubes described above is that of refrigerating apparatus or heating pumps using fluids such as Freon, for example. It is known that every trace of humidity must be avoided in refrigerating apparatus, in view of the fact that a drop of water, when freezing in the diffuser or in the body of the condenser, may form a plug preventing the circulation of the gas.

However, as the materials of the polyamidic type combine in the water in small proportions and are retained therein, the utilization of pipes of polyamidic material causes any trace of humidity in the installation to be withdrawn from the circuit by the material forming the internal wall of the pipes, on condition that the pipes have been dehydrated before the mounting of the installation.

I claim:

1. In combination with a diesel engine including a fuel injection pump, said pump having a plurality of outlet members, a plurality of injector nozzles for each corresponding cylinder of the engine, a plurality of conduits each connecting an outlet member with a related injector nozzle and adapted to carry high-frequency pulsating fluids subjected to pressure peaks up to 1,000 atmospheres,
   said conduits comprising an inner tube and an outer tube,
   said inner tube being of super-polyamidic material capable of containing and resisting the sustained pressure of said fluids,
   said outer tube being of metal and of equal or less wall thickness than the wall thickness of the super-polyamidic inner tube in immediate surrounding contact throughout its length with said inner tube to protect it against external abrasion and cutting,
   said inner and outer tubes constituting a homogeneous safety fluid conductor offering low impedance to fluid flow and providing a non-leakable conduit in the event of accidental rupture of the outer metallic tube.

2. The combination of claim 1, wherein said inner tube has a minimum wall thickness of 0.5 mm. and an internal diameter of 1.5 mm.

3. The combination of claim 1, wherein said inner tube has a wall thickness of 0.8 mm. and an internal diameter of 1.95 mm.

4. The combination of claim 1, wherein said inner tube has a wall thickness of at least 1 mm. and an internal diameter of 3.1 mm.

5. In combination with a diesel engine including a fuel injection pump, said pump having a plurality of outlet members, a plurality of injector nozzles for each corresponding cylinder of the engine, a plurality of conduits each connecting an outlet member with a related injector nozzle and adapted to carry high-frequency pulsating fluids subjected to pressure peaks up to 1,000 atmospheres,
   said conduits comprising an inner tube and an outer tube,
   said inner tube being of super-polyamidic material capable of containing and resisting the sustained pressure of said fluids,
   said outer tube being of metal and of less wall thickness than the wall thickness of the super-polyamidic inner tube in immediate surrounding contact throughout its length with said inner tube to protect it against external abrasion and cutting, said outer tube having its ends flared outwardly,
   said inner and outer tubes constituting a homogeneous safety fluid conductor offering low impedance to fluid flow and providing a non-leakable conduit in the event of accidental rupture of the outer metallic tube,
   means for connecting said conduits to said outlet members and said nozzles, said means comprising,
   a yielding sleeve enclosing the outer tube and mating with its outwardly flaring end,
   a thick rigid frusto-conical ring member fitted in the flaring end of the outer tube over the corresponding end of the inner tube, and the opening of which is at least as large as the bore in the latter,
   a tapped tubular member fitted over the yielding sleeve and screwed onto the related outlet member and nozzle to compress said sleeve to insure a tight connection between said tube and said outlet member and nozzle without reducing the internal diameter of the tube at the point of connection.

6. The combination of claim 5, wherein the inner surface of the flaring end of the outer tube and the outer surface of the rigid ring are annularly corrugated and mate with each other through their corrugations.

7. The combination of claim 5, wherein the rigid ring is of generally bi-truncated shape and the end of the outer tube is force fitted around said ring.

References Cited by the Examiner
UNITED STATES PATENTS

| | | | |
|---|---|---|---|
| 1,066,936 | 7/1913 | McKechnie | 158—36.3 |
| 2,593,316 | 4/1952 | Kraft | 138—30 X |
| 2,806,718 | 9/1957 | Cook et al. | |
| 3,075,576 | 1/1963 | Herbert | 158—50.1 |

MARK NEWMAN, *Primary Examiner.*

RICHARD B. WILKINSON, *Examiner.*